(12) United States Patent
Gagnon et al.

(10) Patent No.: US 8,226,827 B2
(45) Date of Patent: *Jul. 24, 2012

(54) FILTRATION ASSEMBLIES AND METHODS OF INSTALLING FILTRATION UNITS IN FILTRATION ASSEMBLIES

(75) Inventors: Roger Gagnon, Great River, NY (US); Thomas Scholz, Mt. Sinai, NY (US); Sylvia Messier, Stow, MA (US); Martin Weinstein, South Dartmouth, MA (US)

(73) Assignee: Pall Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/100,314

(22) Filed: May 4, 2011

(65) Prior Publication Data

US 2011/0203986 A1  Aug. 25, 2011

Related U.S. Application Data

(63) Continuation of application No. 11/953,235, filed on Dec. 10, 2007, now Pat. No. 7,976,705.

(51) Int. Cl.
*B01D 35/00* (2006.01)

(52) U.S. Cl. .......... 210/232; 55/418; 55/490; 96/4; 29/896.62; 210/321.6; 210/335; 210/359; 210/450; 210/456; 210/542

(58) Field of Classification Search ............ 29/896.62; 210/227, 230, 231, 232, 236, 253, 314, 317, 210/321.72, 321.75, 321.84, 350, 359, 321.6, 210/435, 483, 484, 488, 650, 767, 808, 335, 210/450, 456, 542; 96/4–10; 95/273, 287; 55/418, 490, 491, 492

See application file for complete search history.

(56) References Cited

U.S. PATENT DOCUMENTS

| | | | | |
|---|---|---|---|---|
| 2,864,507 A * | 12/1958 | Isreeli | | 210/321.75 |
| 3,219,573 A * | 11/1965 | Chen et al. | | 204/636 |
| 3,256,174 A * | 6/1966 | Chen et al. | | 204/636 |
| 3,289,846 A * | 12/1966 | Warrington et al. | | 210/232 |
| 3,483,978 A * | 12/1969 | Kracklauer | | 210/394 |
| 3,831,763 A | 8/1974 | Breysse et al. | | |
| 3,837,146 A * | 9/1974 | Faure et al. | | 96/7 |
| 3,979,298 A * | 9/1976 | Breysse et al. | | 210/232 |
| 3,980,564 A * | 9/1976 | Bardin et al. | | 210/321.75 |
| 4,885,087 A * | 12/1989 | Kopf | | 210/321.72 |
| 5,868,930 A * | 2/1999 | Kopf | | 210/321.75 |
| 6,645,380 B2 * | 11/2003 | Baig et al. | | 210/321.6 |
| 7,918,999 B2 * | 4/2011 | Gagnon et al. | | 210/321.72 |
| 7,976,705 B2 * | 7/2011 | Gagnon et al. | | 210/232 |

* cited by examiner

*Primary Examiner* — Joseph Drodge

(74) *Attorney, Agent, or Firm* — Leydig, Voit & Mayer, Ltd.

(57) ABSTRACT

This invention relates to filtration assemblies and methods of installing filtration units in filtration assemblies. Filtration assemblies may include first and second end pieces, at least one filtration unit between the first and second end pieces, and at least one alignment rod arrangement. The alignment rod arrangement may extend between the end pieces and align the filtration units and the end pieces.

22 Claims, 5 Drawing Sheets

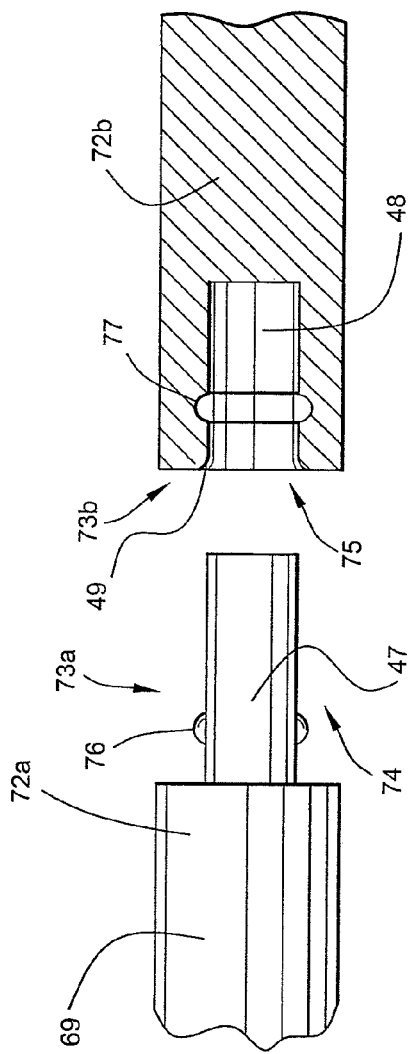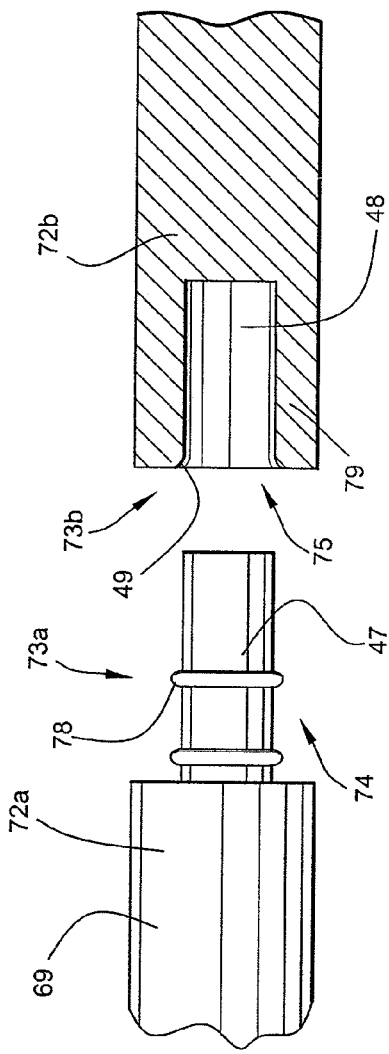

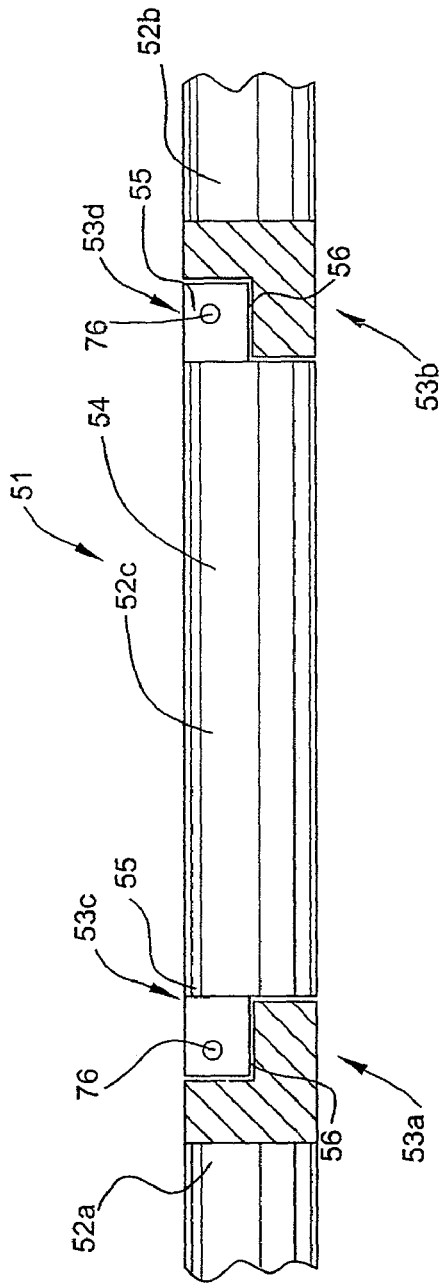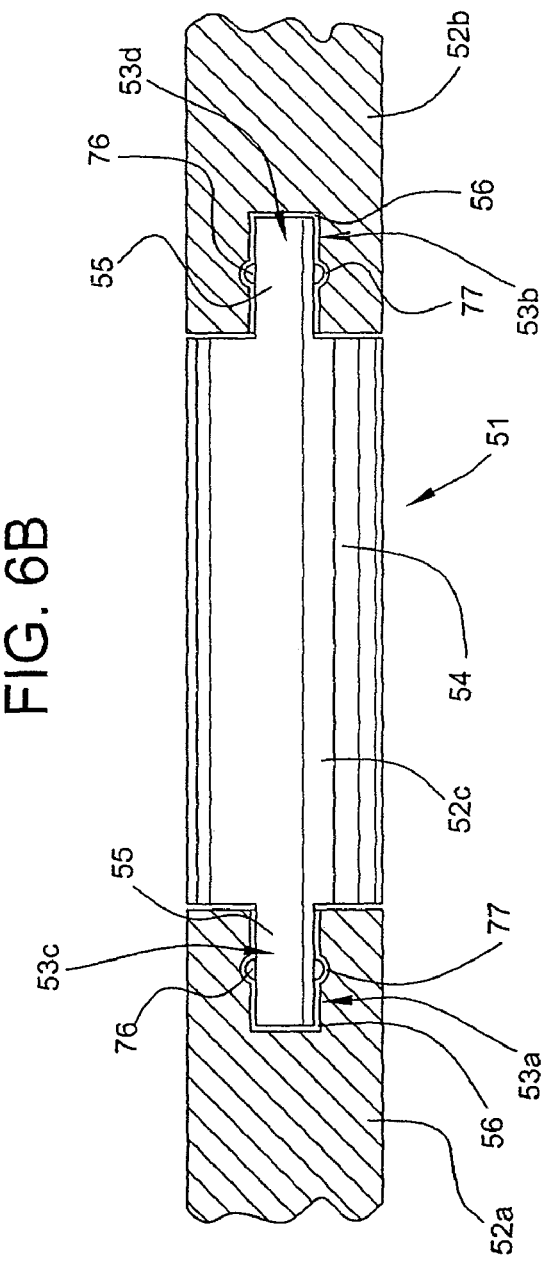

FILTRATION ASSEMBLIES AND METHODS OF INSTALLING FILTRATION UNITS IN FILTRATION ASSEMBLIES

This application is a CON of Ser. No. 11/953,235, filed Dec. 10, 2007, now U.S. Pat. No. 7,976,705.

FIELD OF THE INVENTION

The invention relates to filtration assemblies and methods of installing filtration units into filtration assemblies for any and all types of separation processes. More particularly, it relates to filtration assemblies including removably attachable alignment rod arrangements.

Filtration assemblies embodying the invention may be arranged for tangential flow filtration or for direct flow or dead-end flow filtration. For direct flow or dead-end flow filtration, process or feed fluid is directed to a permeable filtration medium. All of the feed fluid then passes through the filtration medium as filtrate or permeate, except any substances in the fluid that are retained by the filtration medium. For tangential flow filtration, feed fluid is directed tangentially along a permeable filtration medium. A portion of the feed fluid passes through the filtration medium as permeate, and the remaining portion of the feed fluid, the concentrate or retentate, is directed away from the filtration medium.

Filtration assemblies embodying the invention may include at least one filtration unit, and for many embodiments several filtration units, aligned and compressed between first and second end pieces. At least one alignment rod arrangement may extend between the end pieces and align the filtration units. An end piece may further comprise a fitting to which an alignment rod arrangement may be removably attachable. The filtration assemblies may further comprise one or more manifolds that may be arranged with the filtration units to feed fluid to the filtration units and/or to collect fluid from the filtration units.

The alignment rod arrangement may be removably attachable to the filtration assembly, and the alignment rod arrangement may be removably attached through releasably connectable fittings. Detachment of the alignment rod assembly may provide a space for removing one or more filtration units from the assembly and installing one or more new filtration units into the assembly. After installation, the alignment rod arrangement may reattach to align the filtration units.

An alignment rod arrangement may include at least one rod and at least one fitting. An alignment rod may move in any direction to provide space for removing or installing at least one filtration unit. The alignment rod arrangement may also move in any direction to close the space for installing at least one filtration unit and to align the filtration units. For example, the alignment rod arrangement may be slidably mounted to an end piece. Alternatively, the alignment rod arrangement may be arranged to move laterally away from, toward, or between the filtration units and/or end pieces.

BRIEF SUMMARY OF THE INVENTION

The present invention provides highly efficient filtration assemblies and methods of installing filtration units in filtration assemblies.

In accordance with another aspect of the invention, filtration assemblies may comprise first and second end pieces, a manifold, at least one filtration unit, and at least one alignment rod arrangement. The manifold may be positioned between the first and second end pieces and may have fluid passages. The filtration unit(s) may also have fluid passages and may be positioned between one of the end pieces and the manifold. The alignment rod arrangement may be positioned to align the filtration unit or units between the end pieces with the fluid passages in the filtration unit(s) fluidly communicating with the fluid passages in the manifold. The alignment rod arrangement may include an alignment rod mounted between the end pieces to slide longitudinally along one end piece and away from the other end piece.

In accordance with another aspect of the invention, filtration assemblies may comprise first and second end pieces, a manifold, at least one filtration unit, and at least one alignment rod arrangement. The manifold may be positioned between the first and second end pieces and may have fluid passages. The filtration unit(s) may also have fluid passages and may be positioned between one of the end pieces and the manifold. The alignment rod arrangement may be positioned to align the filtration unit or units between the end pieces with the fluid passages in the filtration unit(s) fluidly communicating with the fluid passages in the manifold. The alignment rod arrangement may include an alignment rod mounted to move laterally between the end pieces.

In accordance with another aspect of the invention, methods of installing a filtration unit into a filtration assembly may comprise sliding an alignment rod longitudinally in one direction along one end piece and away from an opposed end piece and installing at least one filtration unit having fluid passages between one of the end pieces and a manifold having fluid passages. The method may further include sliding the alignment rod longitudinally in the opposite direction along the one end piece and toward the opposed end piece. Sliding the alignment rod in the opposite direction may include aligning the filtration unit or units along the alignment rod arrangement with the fluid passages in the filtration unit(s) fluidly communicating with the fluid passages in the manifold.

In accordance with another aspect of the invention, methods of installing a filtration unit into a filtration assembly may comprise moving an alignment rod laterally away from first and second opposed end pieces, installing at least one filtration unit having fluid passages between one of the end pieces and a manifold having fluid passages, and moving the alignment rod laterally between the end pieces. Moving the alignment rod laterally may include aligning the filtration unit or units along the alignment rod arrangement with the fluid passages in the filtration unit(s) fluidly communicating with the fluid passages in the manifold.

Filtration assemblies and methods of installing filtration units into filtration assemblies according to the present invention have many advantages. For example, alignment rod arrangements embodying the invention greatly facilitate displacement of the alignment rod arrangement and loading and unloading of the filtration units. Displacement of the alignment rod arrangement may provide a large enough space through which one or more filtration units may pass when loading or unloading the assembly. Moreover, the space provided by the displacement of the alignment rod arrangement may permit the removal of multiple filtration units simultaneously. Additionally, displacement of the alignment rod arrangement may also permit the removal of a filtration unit from anywhere within a sequence of filtration units without having to remove some or all of the other filtration units in the sequence. Moreover, the displacement of the alignment rods may allow a number of filtration units to be installed or removed without having to slide filtration units one at a time through a small area in the assembly. Accordingly, the alignment rod arrangements of the claimed filtration assemblies may provide increased flexibility, speed, and ease with respect to filtration unit installation and removal, as well as filtration assembly construction and disassembly.

A further advantage of the filtration assemblies and methods of the invention is that the alignment rod arrangement may align any or all of the feed passages, permeate passages, and retentate passages of adjacent filtration units to fluidly communicate with each other and/or with the feed passages, permeate passages, and retentate passages, respectively, of one or more manifolds. Alignment of the feed, permeate, and retentate passages in this manner may advantageously facilitate the flow of feed, permeate, and/or retentate from one filtration unit to an adjacent filtration unit and from the filtration units to one or more manifolds.

BRIEF DESCRIPTION OF THE SEVERAL VIEWS OF THE DRAWINGS

FIG. 4 is a cross-sectional side view of a spring-ball plunger fitting and a fitting including a corresponding groove.

FIG. 5 is a representative cross-sectional side view of a fitting including at least one O-ring and a corresponding fitting including a region that may form a press-fit seal with the O-ring.

FIG. 6A is a cross-sectional side view of a slotted engagement.

FIG. 6B is a cross-sectional top view of the slotted engagement of FIG. 6A.

DETAILED DESCRIPTION OF THE INVENTION

Many different filtration assemblies may embody one or more aspects of the invention. Filtration assemblies according to the invention may include first and second end pieces, at least one filtration unit between the first and second end pieces, and a manifold. The manifold, which may or may not function as one of the end pieces, includes fluid passages that channel feed fluid, permeate and/or retentate to and/or from fluid passages in the filtration units. The filtration assembly may further include one or more, e.g., between two and eight, alignment rod arrangements extending between the end pieces and aligning the filtration units between the end pieces with the fluid passages in the filtration units fluidly communicating among themselves and with the fluid passages in the manifold. The alignment rod arrangements may be configured in a wide variety of ways.

Figure 1:
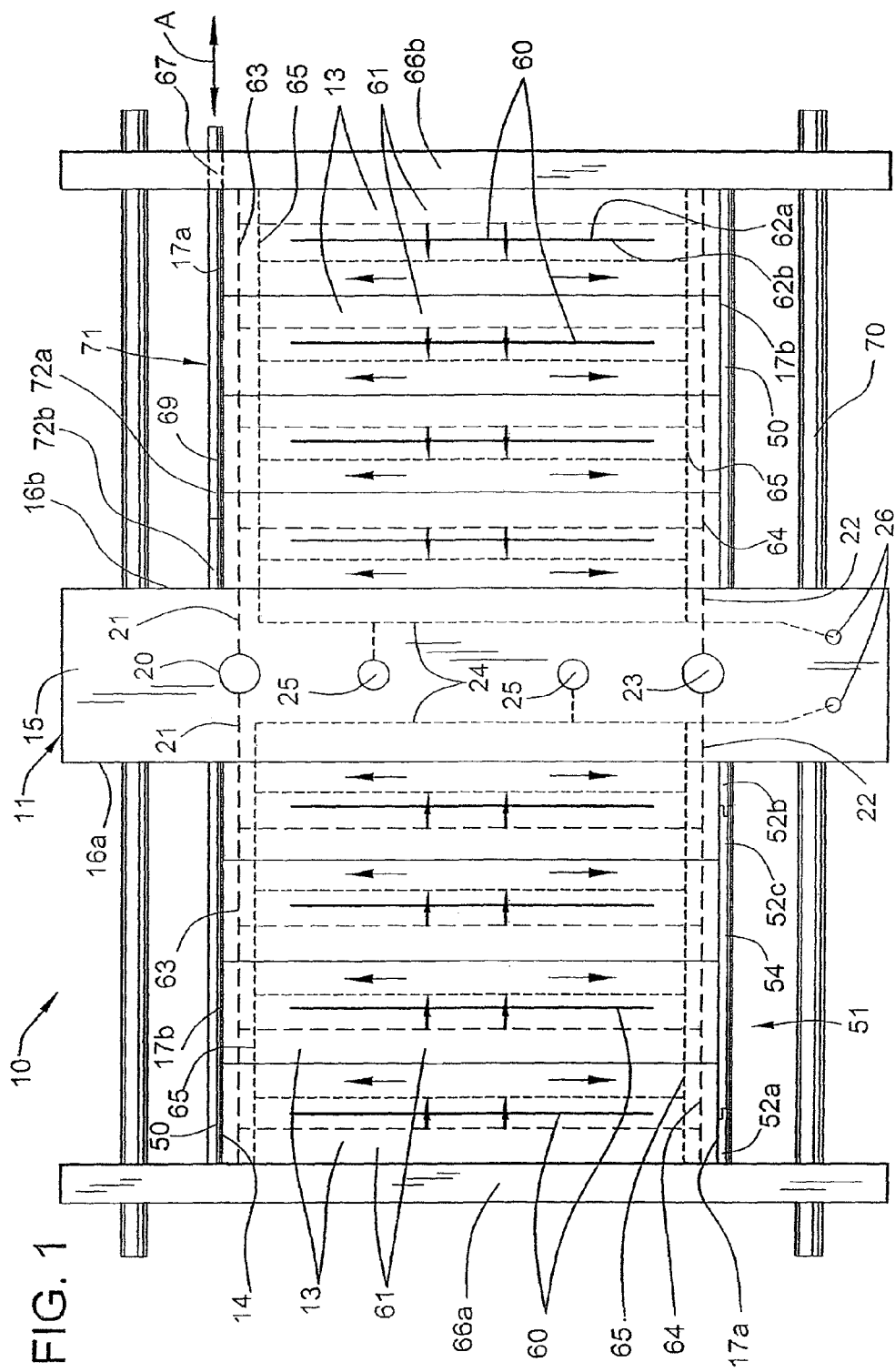
FIG. 1 is a top view of a filtration assembly.

One example of a filtration assembly is shown in FIG. 1. A filtration assembly 10 may include at least one filtration unit 13 between first and second end pieces, e.g., first and second end plates 66a, 66b. The filtration assembly 10 may further include a manifold 11 for directing feed fluid, permeate and/or retentate to and from the filtration units 13. The manifold 11 may be located between the first and second end plates 66a, 66b and may serve as an intermediate end piece for the filtration units 13 on each side of the manifold 11. At least one alignment rod arrangement 71 may extend between an end plate 66a, 66b and the manifold 11, or through the manifold 11 between the first and second end plates, and may align the filtration units 13, the manifold 11, and/or the end plates 66a, 66b.

The alignment rod arrangement may be configured in a number of different ways. The alignment rod arrangement may comprise any suitable material, including, for example, a metal such as stainless steel or a plastic, and may have any suitable configuration, such as, for example, a generally cylindrical configuration. Different filtration assemblies may have different sizes depending, e.g., on the number of filtration units, and the size of the alignment rod arrangement may be varied accordingly.

Figure 2:
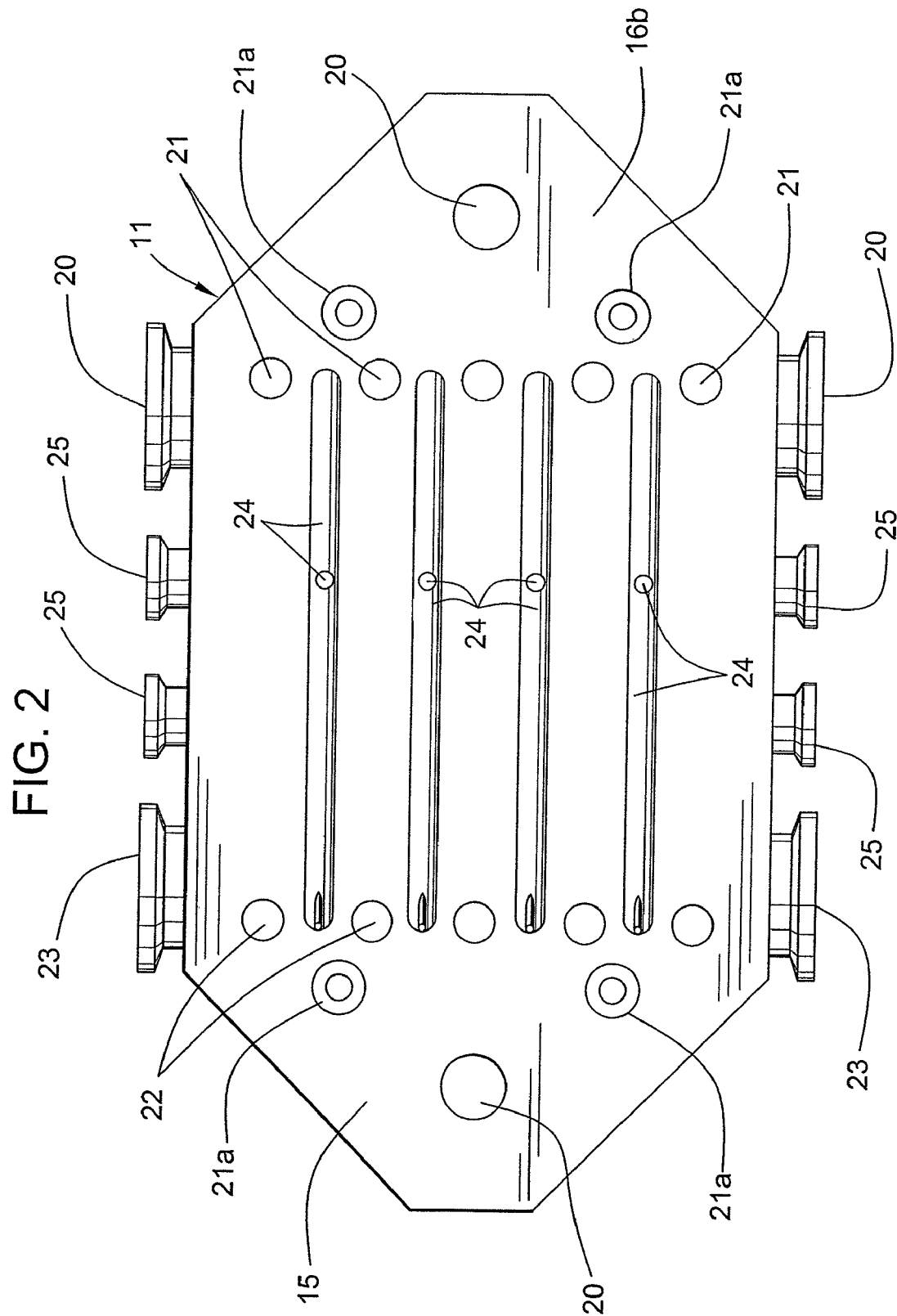
FIG. 2 is a front view of a filtration manifold.
Figure 3:
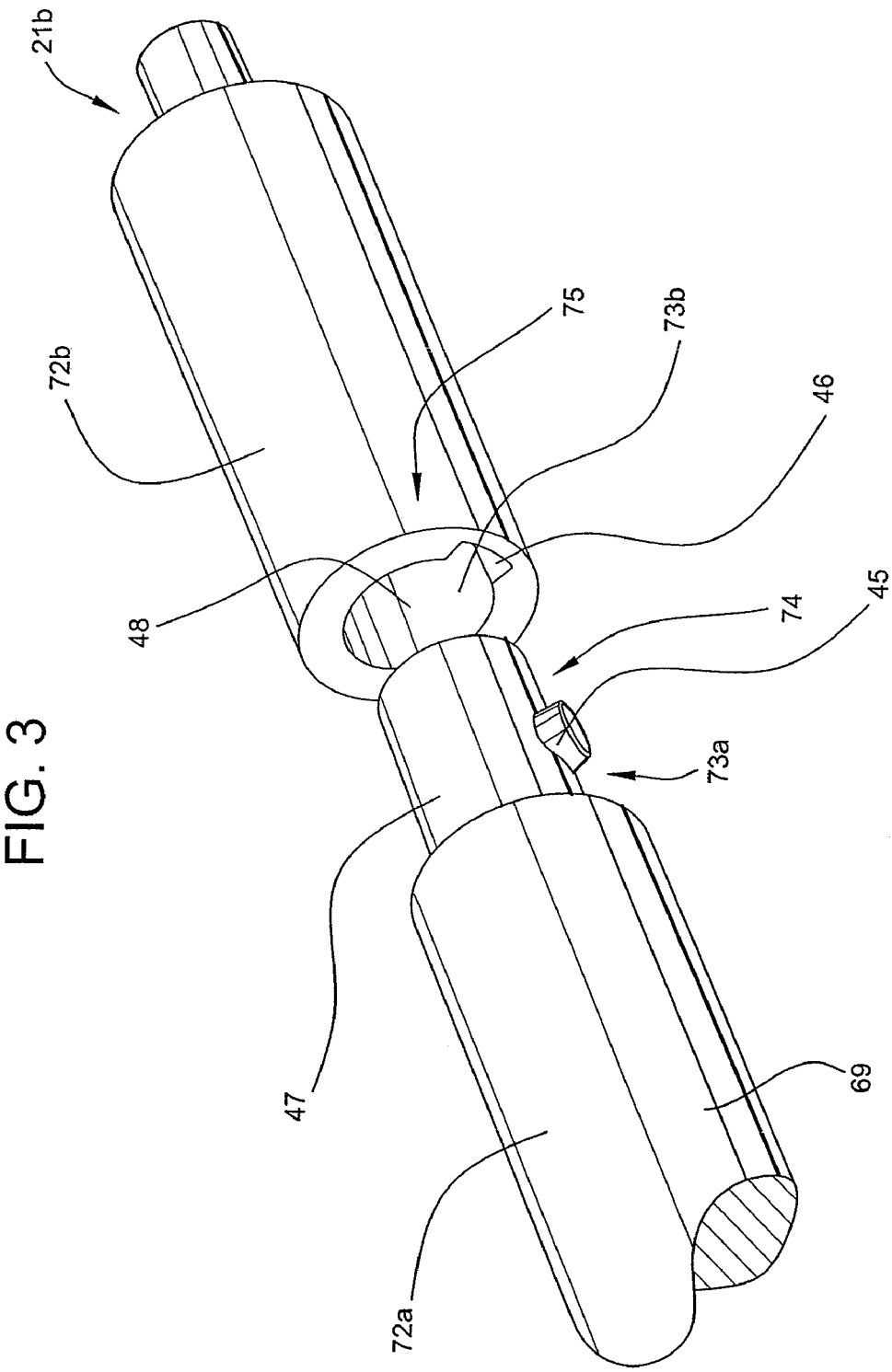
FIG. 3 is a perspective view of a keyed male design fitting and a fitting including a corresponding female socket.

The alignment rod arrangement may include at least two removably attachable components that may be configured in any of a variety of different ways. As shown in FIG. 1, for example, the alignment rod arrangement 71 may include first and second components 72a, 72b removably attachable to one another between the end pieces. An alignment rod arrangement component may be positioned anywhere on the assembly and may include at least one rod, at least one fitting, or both a rod(s) and a fitting(s). Each of the components of the alignment rod arrangement may have identical or different lengths. Further, for many embodiments, each of the components of the alignment rod arrangement may have the same diameter when coupled together, e.g., coupled components may have a consistent or uniform diameter along the length of the coupled alignment rod arrangement. For example, as shown in FIG. 1, the first alignment rod component 72a may be slidably mounted on an end plate 66b. For many embodiments, the first component may pass partially or completely through the end plate, e.g., the second end plate 66b. For other embodiments, the first component may be mounted external to the end plate, e.g., to a collar fixed to the end plate. The second component 72b may be positioned e.g., removably or fixedly positioned, on the manifold 11, for example, in a socket 21a of the manifold, as shown in FIG. 2. As shown in FIGS. 3-5, the first alignment rod component 72a may include a rod 69 and a fitting 73a at one end of the rod 69. The rod 69 may extend from the fitting 73a to or through the second end plate 66b. The second alignment rod component 72b may include a shorter stub having a fitting 21b on one end that mates with the manifold fitting 21a and a fitting 73b on the other end. The first and second alignment rod components 72a, 72b may mate at the fittings 73a, 73b and may have the same diameter when coupled together. Alternatively, the second alignment rod component may be positioned on the first end plate, and the rod may extend slidably through a through hole in the manifold to the second end plate. In many embodiments, the slidably disposed alignment rod component, e.g., the first component 72a, may have a length that is longer than the length of the other alignment rod component, e.g., the second component 72b.

The corresponding fittings of the alignment rod arrangement may be configured in any of a variety of different ways. For example, a fitting may be releasably connectable to another fitting, e.g., on another component of the alignment rod arrangement. A fitting may include any structure, including a socket or a receptacle or a detent mechanism. For many embodiments, the fittings are capable of both securely attaching to another fitting, e.g., a corresponding fitting, and detaching from that other fitting.

For example, a fitting may include a keyed male design or a female socket design. As shown in FIG. 3, for example, a fitting 73a of a first component 72a of the alignment rod arrangement may include a keyed male design 74, and a fitting 73b of a second component 72b may include a corresponding female socket design 75. The keyed male design 74 may be mounted to the rod 69 and may include a stud 47 and a protuberance 45. The female socket design 75 may include a bore 48 which receives the stud 47 and is coaxially disposed in one end of the second component 72b, a longitudinal groove 46 in the wall of the bore 48, and a groove (not shown) in the wall of the bore 48 which intersects and extends perpendicular to the longitudinal groove 46 circumferentially away from the longitudinal groove 46. The keyed male design 74 may correspond with and engage the corresponding female socket design 75. For example, the rod 69 may be slid longitudinally and the stud 47 of keyed male design 74 may be inserted into the bore 48 of corresponding female socket design 75 with the protuberance 45 engaged in the longitudinal groove 46 of the female socket design 75. Upon full insertion of the stud 47 of the keyed male design 74 into the bore 48 of the corresponding female socket design 75, the rod 69 including the alignment rod component 72a and the keyed male design 74 may be rotated about the axis of the rod 69 to move the protuberance 45 out of engagement with the longitudinal groove 46 and into engagement with the groove perpendicular to the longitudinal groove 46. Upon being out of engagement with the longitudinal groove 46, the first and second components 72a, 72b are locked so that first and second components may not be longitudinally pulled apart and the rod 69 may not be axially slid without rotating the protuberance 45 back into engagement with the longitudinal groove 46. Once engaged, the coupled components 72a, 72b may form an alignment rod arrangement that has a uniform outer diameter along the length of the alignment rod arrangement. To disengage the rod 69, the rod 69 including the keyed male design 74 may be rotated in a direction that slides the protuberance 45 through the perpendicular groove and into the longitudinal groove 46. When the protuberance 45 reaches the longitudinal groove 46, the rod 69 may slide longitudinally away from the corresponding female socket design 75. The first and second components may then be longitudinally pulled away from each other and apart.

In another example, a fitting may include a spring ball plunger or a corresponding groove to accept the plunger. As shown in FIG. 4, a fitting 73a of a first component 72a, e.g., the rod 69 of the alignment rod arrangement may include a spring ball plunger 76 on a male design 74. The spring ball plunger 76 may be positioned on a stud 47. The spring ball plunger may include one or more ball plungers positioned on a spring (not shown) under tension, biasing each ball plunger radially outwardly from the stud 47. A fitting 73b of a second component 72b may include a female design 75 having a bore 48 and a corresponding circumferential groove 77 in the wall of the bore 48 to accept the ball plunger(s). The groove 77 may extend radially into the wall of the bore 48. The bore 48 may include a flared external edge 49 that is capable of engaging and depressing each ball plunger into the stud 47. The fitting 73a including the spring ball plunger 76 may correspond with and engage the corresponding fitting 73b including the groove 77 to accept the spring ball plunger. For example, rod 69 may be slid longitudinally toward the second component 72b and the stud 47 of the fitting of the first component 72a may be inserted into the bore 48 of corresponding fitting of the second component 72b. Upon insertion of the stud 47 into the bore 48, the spring ball plunger 76 may engage the flared edge 49 of the bore 48, depressing the spring ball plungers. Upon further insertion of the stud 47 into the bore 48, each spring ball plunger 76 may be radially depressed into the stud 47 by the inside wall of bore 48. Upon full insertion of the stud 47 into the bore 48, the spring ball plunger may reach the corresponding groove 77, the spring tension forcing each plunger to rise up into, and remain in, the groove 77. Upon engagement of the spring ball plunger 76 with the groove 77, the first and second components may be securely fastened. Again, the coupled components 72a, 72b may form an alignment rod arrangement that has a uniform outer diameter along the length of the alignment rod arrangement. To disconnect the fittings, the rod 69 may be pulled longitudinally away from the second connector 72b. The edges of the groove 77 may depress the spring ball plungers into the stud 47 and the fitting with the depressed spring ball plungers 76 may be pulled longitudinally out of the bore 48, so that the stud 47 may be pulled longitudinally away from the bore 48 and the first and second components may detach.

In still another example, a fitting may include a resilient O-ring that forms a press fit when the O-ring is engaged with a bore. For example, as shown in FIG. 5, a fitting 73a of the first component 72a, e.g., the rod 69, may include at least one O-ring 78, e.g., two O-rings, positioned in grooves in a stud 47 of a male design 74. The fitting 73b of a second component 72b may include a female design 75 having a bore 48 which receives the stud 47 and includes a region 79 in the wall of the bore 48 that may form a press fit when the O-ring 78 is engaged in the bore 48. The bore 48 may include a flared external edge 49 that is capable of engaging and compressing the O-ring. The fitting 73a including the O-ring 78 may correspond with and engage the corresponding fitting 73b including the bore 48. For example, the rod 69 may be longitudinally slid toward the second component 72b and the stud 47 of the fitting of the first component 72a may be inserted into the bore 48 of the corresponding fitting of the second component 72b. Upon insertion of the stud 47 into the bore 48, each O-ring 78 may engage the flared edge 49, compressing the O-ring. Upon full insertion of the stud 47 into the bore 48, each O-ring may be resiliently compressed between the stud 47 and the region 79 of the bore 48 and may form a tight, frictional fit within the bore 48. Again, the coupled components 72a, 72b may form an alignment rod arrangement that has a uniform outer diameter along the length of the alignment rod arrangement. To disconnect the fittings, the rod 69 may be longitudinally slid away from the second connector 72b and the fitting with the O-rings 78 may be pulled longitudinally away from the bore 48, disengaging the press fit, so that the stud 47 may be pulled longitudinally away from and out of the bore 48 and the first and second components 72a, 72b may detach.

The releasably connectable fittings may be configured in numerous other ways. For example, the fitting having the bore may be part of the first component while the fitting having the stud may be part of the second component. Further, the above fittings are merely exemplary and do not exclude the possibility of a removable attachment attainable from other types of fittings. A fitting may include any structure that is capable of both securely attaching to another fitting, e.g., a corresponding fitting, and detaching from that other fitting. Other fittings may include, but are not limited to, threaded studs and correspondingly threaded nuts. Further, although the fittings of the alignment rod arrangements previously described are positioned on the first and second components of each alignment rod arrangement, one or more of the fittings may be positioned elsewhere in the filtration assembly. For example, one of the fittings, e.g., the fitting having the bore, may be associated with the manifold or an end piece in any of a variety of different ways. For example, the fitting may be bonded or welded or threaded to the manifold or an end piece. As yet another example, one of the fittings, e.g., the fitting having the bore, may be integrally formed within the manifold or end piece, for example, by machining the fitting in one side of the manifold or end piece. In many of these embodiments, the detachably connectable alignment rod arrangement may be no more than a single component which includes, for example, a rod and the corresponding fitting, e.g., the fitting having the stud, on one end of the rod. For example, one or more fittings having the bore may be formed in one side of the manifold, and one or more rods which include fittings having the stud may be slidably disposed in an end piece. Each fitting on the rod may be similarly coupled and uncoupled from the corresponding fitting on the manifold as previously described with respect to the fittings on the first and second components of the alignment rod arrangement.

The end pieces may be configured in any of a variety of different ways. For example, as shown in FIG. 1, the end pieces may be configured as end plates 66a, 66b. Each end plate 66a, 66b may include no fluid passages and may plug any flow passages in the adjacent filtration unit that open onto the end plate. Alternatively, the end plates may include additional fluid passages that fluidly communicate with the flow passages in the adjacent filtration unit. A filtration manifold may also function as an end piece on one or both ends of the filtration assembly or intermediate the two end plates 66a, 66b, as shown in FIG. 1, for example. Some embodiments may have two end plates which serve as end pieces and no manifolds, other embodiments may have two manifolds which serve as end pieces and no end plates, and still other embodiments may have a combination of one or more end plates and one or more manifolds which serve as end pieces. One or both of the end pieces may further comprise one or more holes, fittings, or sockets in which, for example, an alignment rod arrangement may be disposed. The hole or socket may further comprise a bushing in which the alignment rod arrangement may be slidably disposed. For example, as shown in FIG. 1, end plate 66b may include a bushing 67 through which the rod 69 may be slidably disposed, e.g., allowing the rod 69 to slide in both directions relative to the end plate 66b as represented by the arrow A.

A filtration unit may have any size and shape and may be configured in a variety of different ways. For example, a filtration unit may include a filtration medium cooperatively arranged with a casing. The filtration unit may be part of a plate and frame device in which separate filtration medium sheets and frames are compressed and sealed between one another. Alternatively, the filtration unit may comprise a filtration cassette in which a filtration medium is integrally fitted with and sealed to a casing.

As shown in FIG. 1, each filtration unit 13 may include a filtration medium 60 arranged with a casing 61 to define a feed side 62a and a permeate side 62b of the filtration medium 60. A filtration unit 13 may also include at least one feed passage 63 fluidly communicating with the feed side 62a of the filtration medium 60 and at least one permeate passage 65 fluidly communicating with the permeate side 62b of the medium. In tangential flow filtration assemblies, a filtration unit 13 may additionally include at least one retentate passage 64 fluidly communicating with the feed side 62a of the filtration medium. Filtration assemblies arranged for direct flow or dead-end flow filtration may not have any retentate passages.

The filter medium may be permeable and may have any suitable treatment characteristic. For example, the filtration medium may have, or may be modified to have, any of several characteristics. The filtration medium may have a positive, negative, or neutral electrical charge; it may be liquiphobic or liquiphilic, including, for example, hydrophobic or hydrophilic, or oleophobic or oleophilic; it may include attached functional groups, such as ligands, that can chemically bind to substances in the fluid. The filtration medium may be formed from, impregnated with, or otherwise contain a variety of materials, such as sorbents, ion exchange resins, enzymes, or catalysts, that may chemically or physically bind, react with, or otherwise alter substances in the fluid. Further, the filtration medium may have any of a wide range of molecular cutoffs or removal ratings, including, for example, from ultraporous or nanoporous or finer to microporous or coarser. The filtration medium may thus function as a treatment medium of any type, including a capture medium, a separation medium, or a filter medium.

The casing of the filtration unit may include any suitable housing for the filtration medium, e.g., a frame. The filtration unit may further comprise an exterior which may include, e.g., the exterior of the casing, and along which an alignment rod arrangement may extend. For example, as shown in FIG. 1, the filtration unit 13 may comprise an exterior 14 along which an alignment rod arrangement 71 may extend. The exterior 14 of the filtration unit may be configured so that the alignment rod arrangement fits in close proximity, e.g., contacts, along the exterior 14 of the filtration unit. In some embodiments, a filtration assembly may further include one or more fixed alignment rods which extend between the end plates or between an end plate and a manifold along with one or more removably attachable alignment rod arrangements. A fixed alignment rod may be one that is not removable without disassembling the filtration assembly, and a filtration assembly may include any number of fixed alignment rods and any number of alignment rod arrangements in combination. Some embodiments of the filtration assembly may include one or more alignment rod arrangements and no fixed alignment rods.

A filtration unit may include first and second edges along which one or more fixed alignment rods and/or one or more alignment rod arrangements may align the filtration units. For example, as shown in FIG. 1, an alignment rod arrangement 71 may align the filtration units along a first edge 17a of the filtration units 13 and a fixed alignment rod 50 may align the filtration units 13 along a second edge 17b. The exterior of each casing may include a cutout in which the fixed alignment rods and/or the alignment rod arrangements may be positioned. In other embodiments, each casing may include one or more through holes, and one or more removably attachable alignment rod arrangements may be positioned along the interior of each filtration unit within the through holes of the casings to align the filtration units. For example, the alignment rod arrangements may be long enough to extend not only through all of the through holes of the aligned filtration units in the filtration assembly but also through and somewhat beyond an end piece. The alignment rod arrangements may then be detached and reattached as previously explained by manipulating the portion of the alignment rod arrangement which extends beyond the end piece and sliding the rod of the alignment rod arrangement longitudinally through the through holes of one or more filtration units.

The filtration assembly may be arranged in any of a variety of different ways. For example, at least one filtration unit may be positioned between the first and second end pieces. For example, at least one filtration unit may be positioned between an end piece and one or both sides of a manifold. In the embodiment shown in FIG. 1, for example, at least a plurality of filtration units 13 may be positioned between the first end plate 66a and the first side 16a of manifold 11 and a plurality of filtration units 13 may be positioned between the second end plate 66b and the second side 16b of manifold 11, the manifold 11 serving as an intermediate end piece. In some embodiments, all of the filtration units may be positioned between one end piece on one end of the filtration assembly and one side of the manifold on the other end of the filtration assembly.

The filtration assembly may include a sequence of any number of filtration units positioned between two end pieces or between a manifold and an end plate. The sequence may include a series of adjacent filtration units. For example, the filtration assembly 10 shown in FIG. 1 includes four adjacent filtration units 13 between end plate 66a and manifold 11 and four adjacent filtration units 13 between end plate 66b and manifold 11.

The filtration assembly may further include a manifold that may be configured in any of a variety of different ways. For example, as shown in FIGS. 1 and 2, a filtration manifold 11 may comprise a body 15 having first and second opposite sides 16a, 16b. The body of the manifold may comprise any suitable material, including, for example, a metal such as stainless steel, or a plastic, and may have any suitable configuration, such as, for example, a generally hexagonal configuration as shown in FIG. 2. Different separation processes may require different types and/or sizes of filtration units, and the shape and size of the manifold may be varied accordingly.

The body of the manifold may include any or all of permeate collection passages, feed passages, and retentate passages. For example, as shown in FIGS. 1 and 2, a tangential flow filtration manifold may include one or more feed inlets 20 and feed passages 21, one or more retentate passages 22 and retentate outlets 23, one or more permeate passages 24 and permeate outlets 25, and/or one or more sampling ports 26. Alternatively, a dead-end flow or direct flow filtration manifold may include feed passages and permeate passages but may lack retentate passages. In some embodiments, the body of the manifold may include first and second permeate collection passages that may be configured in any of a variety of different ways. For example, the manifold may, or may not, be configured as disclosed in U.S. Provisional Patent Application No. 60/874,012 entitled Filtration Assemblies, Filtration Manifolds, Filtration Units, and Methods of Channeling Permeate, which listed Roger Gagnon, Thomas Scholz, Martin Weinstein, Sylvia Messier, and Steven Pearl as an inventor and which was filed on Dec. 11, 2006. The manifold may be bidirectional, i.e., any or all of the permeate fluid, feed fluid, and/or retentate fluid may flow into, or from, the manifold in at least two different, e.g., opposite, directions. In other embodiments, the manifold may be unidirectional, i.e., any or all of the permeate fluid, feed fluid, and/or retentate fluid may flow into, or from, the manifold in only one direction.

The body of the manifold may also include any of a variety of coupling elements that may connect the manifold within a filtration assembly in any of a variety of different ways. Coupling elements may include holes, sockets, fittings, bolts, rivets, screws, or any other structure that may securely attach the filtration manifold within the filtration assembly. For example, as shown in FIG. 2, the body 15 may include multiple sockets 21a that may connect to alignment rod arrangements and/or fixed alignment rods which align the filtration units within the filtration assembly. The body 15 may also include two through holes 20 that may pass through the body, and the filter assembly 10 may further include compression rod arrangements having compression rods 70 that extend through the through holes in the manifold and in the end pieces, sealingly compressing the end pieces, manifold, and filtration units together with their respective fluid passages communicating with one another. The compression rod arrangements may have any of numerous configurations. For example, compression rod arrangements may, or may not, be configured as disclosed in U.S. Provisional Patent Application No. 60/873,980 entitled Filtration Assemblies and Methods of Maintaining Compression of Filtration Units in Filtration Assemblies, which listed Roger Gagnon, Franco Morizio, and Robert Ieraci as an inventor and which was filed on Dec. 11, 2006. Some embodiments may not include separate compression rod arrangements. The alignment rod arrangements may then serve to establish and/or maintain compression of the filtration assembly as well as align the filtration units and the manifold.

The alignment rod arrangement may be assembled into the filtration assembly in any of a variety of different ways. For example, as shown in FIG. 1, the alignment rod arrangement 71 may extend between two end pieces, e.g., the manifold 11 and the end plate 66b and may align the filtration units 13 along the exterior of the filtration units 13 with the respective feed, retentate, and permeate passages 21, 63; 22, 64; 24, 65 of the manifold 11 and the filtration units 13 properly communicating with one another.

Other embodiments of the alignment rod arrangement may be configured to move laterally rather than longitudinally to allow the filtration units to be installed and/or uninstalled. For example, an alignment rod arrangement may include at least three interconnected components configured in any of a variety of different ways to allow at least one of the components to move laterally. As shown in FIGS. 1, 6A, and 6B, for example, the alignment rod arrangement 51 may include three components 52a, 52b, and 52c removably attached between the end pieces. The alignment rod arrangement 51 may be positioned within the filtration assembly as described for the first embodiment of the alignment rod arrangement 71, for example, between two end plates or between an end plate and a manifold. As shown in FIG. 1, for example, alignment rod arrangement 51 may extend between the manifold 11 and an end plate 66a. The alignment rod arrangement 51 may also align filtration units 13 as described for the first embodiment.

Each of the components may be configured in a variety of different ways. For example, the first removably attachable component 52a may comprise a short stub which may be permanently or removably attached on one end to an end piece, e.g., the end plate 66a, and may include a fitting 53a on an opposite end. The second removably attachable component 52b may similarly comprise a short stub which may be permanently or removably attached on one end to the manifold 11 and may include a fitting 53b on an opposite end. The third removably attachable component 52c may include a rod 54 and a first fitting 53c on one end of the rod 54 and a second fitting 53d on an opposite end of the rod 54. The first, second, and third components 52a, 52b, 52c may mate at the fittings 53a, 53b, 53c, 53d. The third removably attachable component 52c may connect and be detachable from the first and/or second components 52a, 52b. For example, the first fitting 53c of the rod 54 may be releasably connectable to the fitting 53a of the first component 52a and the second fitting 53d of the rod 54 may be releasably connectable to the second fitting 53b of the second component 52b, permitting the alignment rod 54 to detach from fittings 53a and 53b and move laterally from between the end plate 66a and the manifold 11 to provide a space for the installation or removal of the filtration units 13.

The fittings of the alignment rod arrangement of the second embodiment may be configured in any of a variety of different ways. For example, the fittings of the second embodiment may include slot and bar engagement fittings. For example, as shown in FIGS. 6A and 6B, the fittings 53a, 53b of the first and second components 52a, 52b, respectively, may each include a slot 56 having a depression 77. The first and second fittings 53c, 53d of the third component 52c, e.g., the rod 54, may each include a bar 55 that may also comprise a detent mechanism such as a spring ball plunger 76. The bars 55 of the fittings 53c, 53d of the rod 54 may engage with the slots 56 of the fittings 53a, 53b of the first and second components 52a, 52b, respectively, so that the rod 54 may be attached to fittings 53a, 53b. For example, the bars 55 of the rod 54 may be moved laterally into or out of the slots 56. A detent mechanism, such as the spring ball plunger 76, may also engage with the depression 77 to even more securely hold the rod 54 in place.

Although the previously described alignment rod arrangements may have one, two, or three components, alignment rod arrangements of the invention may include any number of removably attached components, for example, four or more removably attached components.

Methods according to the invention may include removing and/or installing one or more filtration units from/into a filtration assembly in any of a variety of different ways. One or more components of an alignment rod arrangement may detach, e.g., the fittings may disconnect, between opposed end pieces to allow removal or insertion of the filtration units. For example, as shown in FIG. 1 and FIGS. 3-5, the first component 72a, e.g., the rod 69, may detach from the second component 72b by disconnecting the first fitting 73a from the second fitting 73b. The fittings may be disconnected in any manner appropriate for the releasably connectable fittings, for example, in any manner previously described for the fittings. An alignment rod component may move, e.g., slide, longitudinally along the interior or the exterior of the filtration units to disconnect the fittings. For example, as shown in FIG. 1, the fittings 73a, 73b may be disconnected and the first component 72a, including the alignment rod 69, may slide along, e.g., through, one end plate 66b through the bushing 67 and away from the manifold 11, as shown by arrow A. Longitudinally moving, e.g., sliding, the rod 69 may provide a space for loading or unloading the filtration units.

Methods of removing and/or installing a filtration unit from/into a filtration assembly may further comprise removing and/or installing at least one filtration unit between the first and second end pieces in a variety of different ways. For example, as shown in FIG. 1, at least one filtration unit 13 may be removed and/or installed between end plates 66a and 66b, or between the manifold 11 and either of the end plates 66a, 66b, after the compression rods 70 have been loosened. Detaching components of the alignment rod arrangement 71 and sliding the rod 69 away from the manifold 11 along the end plate 66b may provide a variable space, e.g., a smaller or larger space, through which one or multiple filtration units 13 may be removed from and/or installed into the filtration assembly 10 sequentially or simultaneously by moving the filtration unit(s) laterally through the space.

Methods of removing and/or installing a filtration unit from/into a filtration assembly may further comprise reattaching the components of the alignment rod arrangement between the end pieces in a variety of different ways. One of the alignment rod components may slide longitudinally to close the space for the loading of the filtration units. For example, the first alignment rod component including rod may slide longitudinally through one end piece and toward the other end piece. For example, as shown in FIG. 1, the alignment rod 69 may slide through bushing 67 of the second end plate 66b through and toward the manifold the 11 to close the space that was opened for the loading of the filtration units, as shown by arrow A. Once the first and second components contact one another, the fittings may be reattached. As shown in FIG. 1, for example, first component 72a may reattach to second component 72b by reconnecting the first fitting 73a to the second fitting 73b. The first and second fittings may be reconnected in any manner appropriate for the releasably connectable fittings, for example, in a manner described for the fittings above.

Reattaching the components of the alignment rod arrangement may further include aligning the filtration units and end pieces, e.g., the end plates and/or manifold, along the alignment rod arrangement in any of a variety of different ways. For example, as shown in FIG. 1, sliding the first component 72a including the rod 69 toward the manifold 11 may include closely positioning, e.g., contacting, the rod 69 and the filtration units 13, thereby maintaining alignment and proper fluid communication of the respective fluid passages 21, 63; 22, 64; 24, 65 in the manifold 11 and the filtration units.

The alignment rod arrangement may align filtration units within a filtration assembly in any of a variety of different ways. The alignment rod arrangement may align multiple filtration units in a sequence with each other and/or with one or more manifolds. For example, the alignment rod arrangement may extend along the exterior of the filtration units. For example, as shown in FIG. 1, alignment rod arrangement 71 may extend along and contact the exterior 14 of the filtration units 13. Additionally, the alignment rod arrangement may fit inside a cut-out in the exterior of the filtration unit to align the filtration units. Alternatively, the alignment rod arrangement may slide through through holes in the interior of the filtration units to align the filtration units.

The filtration units may be aligned by the alignment rod arrangements for any of a variety of different purposes. For example, the alignment rod arrangement may align the feed passage(s) of a filtration unit to fluidly communicate with the feed passage(s) of an adjacent filtration unit in the sequence and/or the feed passage(s) of a manifold. Alternatively or additionally, the alignment rod arrangement may align the permeate passage(s) of a filtration unit to fluidly communicate with the permeate passage(s) of an adjacent filtration unit in the sequence and/or the permeate passage(s) of a manifold. Alternatively or additionally, the alignment rod arrangement may align the retentate passage(s) of a tangential flow filtration unit to fluidly communicate with the retentate passage(s) of an adjacent filtration unit in the sequence and/or the retentate passage(s) of a manifold. Attachment of the components of the alignment rod arrangement may move the filtration units into alignment with each other and/or with the manifold, and the assembled alignment rod arrangement may maintain the filtration units in alignment with each other as well as with the manifold. The alignment rod arrangement may provide a sequence of filtration units including aligned feed and permeate passages that may also be aligned with at least one of the feed and permeate passages of the manifold(s), respectively. In a tangential flow filtration assembly, the alignment rod arrangement may additionally provide a sequence of filtration units including aligned retentate passages that may also be aligned with at least one of the retentate passages of the manifold(s), respectively.

Like the longitudinally sliding embodiments of the alignment rod arrangement, other embodiments of the alignment rod arrangement may be detached in a variety of different ways. In some embodiments, an alignment rod component may move laterally away from the filtration units or the end pieces to disconnect the fittings. For example, as shown in FIG. 1 and FIGS. 6A and 6B, the first fitting 53c of the third component 52c of the alignment rod arrangement may disconnect from the fitting 53a of the first component 52a and the second fitting 53d of third component 52c may disconnect from fitting 53b of the second component 52b. The third component 52c including the rod 54 may then move laterally away from the filtration units and the end pieces. As shown in FIGS. 6A and 6B, for example, the bars 55 of the fittings 53c, 53d of the third component 52c may disengage from the slots 56 of the fittings 53a, 53b of first and second components 52a, 52b between the end pieces. A detent mechanism, such as a spring ball plunger 76, may also disengage from the recesses 77. Upon disconnecting both fittings 53c, 53d of the third removably attached component 52c from the fittings 53a, 53b of the first and second components 52a, 52b, respectively, the third component 52c may move laterally away from the filtration units 13 and the end pieces, e.g., laterally away from the manifold 11 and the end plate 66a. For example, the rod 54 may move laterally away from end plate 66a and manifold 11 to produce a space for loading and/or unloading filtration units 13. The methods of the second embodiment may further include installing and/or uninstalling the filtration units as described for the first embodiment.

The three releasably attachable components of the second embodiment may also reattach between the end pieces in a variety of different ways. For example, the third component may move laterally to close the space for the loading of the filtration units. As shown in FIG. 1, for example, the third component 52c including the rod 54 may move laterally toward or between the end pieces, e.g., the manifold 11 and end plate 66a, to close the space for loading and unloading the filtration units 13. As shown in FIGS. 6A and 6B, for example, the third component 52c may reattach to each of the first and second releasable components 52a, 52b by reconnecting the first and second fittings of the third component 53c, 53d to the fittings of the first and end pieces 53a, 53b, respectively, between the end pieces. For example, as shown in FIGS. 6A and 6B, bars 55 of fittings 53c, 53d of third component 52c may reengage the slots 56 of the fittings 53a, 53b of the first and second components 52a, 52b, respectively. A detent mechanism, such as a spring ball plunger 76, may also reengage with groove 77. The third component 52c may thus be reattached to first and second components 52a, 52b and may align the filtration units 13 as described for the first embodiment. For example, as shown in FIG. 1, moving the rod 54 of the alignment rod arrangement 51 laterally toward or between the end plate 66a and the manifold 11 may include aligning the filtration units 13, the end plate 66a, and the manifold 11 with each other.

Although the second embodiment has been described with respect to an alignment rod which completely separates from the first and second components, other embodiments may include an alignment rod which remains attached to one of the first and second components of the alignment rod arrangement. For example, the slot and bar fitting of one of the first and second components may be changed to a pivot arrangement which pivotably connects the component to the alignment rod. The alignment rod may then be moved laterally by pivoting the alignment rod about the pivot arrangement away from, or toward, the filtration units and may be detached from, or attached to, the other of the first and second components by, for example, a slot and bar fitting.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filtration assembly comprising:
   first and second end pieces;
   a manifold positioned between the first and second end pieces, the manifold having fluid passages;
   at least one filtration unit having fluid passages and being positioned between one of the end pieces and the manifold; and
   at least one alignment rod arrangement positioned to align the filtration unit or units between the end pieces with the fluid passages in the fluid treatment unit fluidly communicating with the fluid passages in the manifold, the alignment rod arrangement including an alignment rod mounted between the end pieces to slide longitudinally along one end piece and away from the other end piece.

2. The filtration assembly according to claim 1 wherein the alignment rod arrangement includes at least first and second components removably attachable to one another between the end pieces, the alignment rod being one of the first and second components.

3. A filtration assembly according to claim 2, wherein the first component includes a first fitting and the second component includes a second fitting, the first and second fittings being releasably connectable to one another.

4. A filtration assembly according to claim 3, wherein one of the fittings has a male design and the other fitting has a corresponding female socket design which receives the male design.

5. A filtration assembly according to claim 2, wherein the alignment rod arrangement has a consistent diameter between the end pieces.

6. A filtration assembly according to claim 1, wherein the filtration unit has an exterior and the alignment rod arrangement extends along the exterior of the filtration unit.

7. A filtration assembly according to claim 1, wherein each of the first and second end pieces comprises an end plate.

8. The filtration assembly of claim 1, wherein one of the end pieces includes a fitting and wherein the alignment rod includes a fitting, the fittings of the end piece and the alignment rod being releasably connected to one another.

9. The filtration assembly of claim 1, wherein the alignment rod arrangement further includes a component having a fitting and wherein the alignment rod has a fitting, the fittings of the component and the alignment rod being releasably connected to one another between the end pieces.

10. A filtration assembly comprising:
first and second end pieces;
a manifold positioned between the first and second end pieces, the manifold having fluid passages;
at least one filtration unit having fluid passages and being positioned between one of the end pieces and the manifold; and
at least one alignment rod arrangement positioned to align the filtration unit or units between the end pieces with the fluid passages in the fluid treatment unit fluidly communicating with the fluid passages in the manifold, the alignment rod arrangement including an alignment rod mounted to move laterally between the end pieces.

11. A filtration assembly according to claim 10, wherein the alignment rod arrangement comprises first, second, and third components coupled to one another between the end pieces, the alignment rod being one of the first, second, and third components.

12. A filtration assembly according to claim 11, wherein the alignment rod is completely separable from one of the other two components.

13. A filtration assembly according to claim 11 wherein the alignment rod is completely separable from both of the other two components.

14. A filtration assembly according to claim 11, wherein the first component includes a first fitting and the second component includes a second fitting, the first and second fittings being releasably connectable to one another.

15. A filtration assembly according to claim 14, wherein the fittings comprise a slot in the first component and a bar on the second component that engages the slot.

16. A filtration assembly according to claim 11, wherein the alignment rod arrangement has a consistent diameter between the end pieces.

17. A filtration assembly according to claim 10, wherein the filtration unit has an exterior and the alignment rod arrangement extends along the exterior of the filtration unit.

18. A filtration assembly according to claim 10, wherein each of the first and second end pieces comprises an end plate.

19. A method of installing a filtration unit into a filtration assembly comprising:
sliding an alignment rod longitudinally in one direction along one end piece and away from an opposed end piece;
installing at least one filtration unit having fluid passages between one of the end pieces and a manifold having fluid passages; and
sliding the alignment rod longitudinally in the opposite direction along the one end piece and toward the opposed end piece, including aligning the filtration unit or units along the alignment rod with the fluid passages in the fluid treatment unit fluidly communicating with the fluid passages in the manifold.

20. The method of claim 19 further comprising:
detaching the alignment rod from a second component of an alignment rod arrangement between the end pieces before sliding the alignment rod longitudinally in said one direction and
attaching the alignment rod to the second component after sliding the alignment rod in the opposite direction.

21. A method of installing a filtration unit into a filtration assembly comprising:
moving an alignment rod laterally away from first and second opposed end pieces;
installing at least one filtration unit having fluid passages between one of the end pieces and a manifold having fluid passages; and
moving the alignment rod laterally between the end pieces, including aligning the filtration unit or units along the alignment rod with the fluid passages in the fluid treatment unit fluidly communicating with the fluid passages in the manifold.

22. The method of claim 21 further comprising:
detaching the alignment rod from a second component of an alignment rod arrangement between the end pieces before moving the alignment rod laterally away from the first and second end pieces and
attaching the alignment rod to the second component after moving the alignment rod laterally between the end pieces.

* * * * *